United States Patent
Hotani (10) Patent No.: US 9,310,757 B2
(45) Date of Patent: Apr. 12, 2016

(54) ATTACHMENT MECHANISM OF OPTICAL SCANNING DEVICE AND IMAGE FORMING APPARATUS INCLUDING THIS ATTACHMENT MECHANISM

(71) Applicant: KYOCERA Document Solutions Inc., Osaka (JP)

(72) Inventor: Tomoya Hotani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/811,480

(22) Filed: Jul. 28, 2015

(65) Prior Publication Data
US 2016/0033930 A1 Feb. 4, 2016

(30) Foreign Application Priority Data
Jul. 29, 2014 (JP) .................. 2014-153485

(51) Int. Cl.
G03G 15/00 (2006.01)
G03G 21/16 (2006.01)
H04N 1/00 (2006.01)
G03G 15/04 (2006.01)

(52) U.S. Cl.
CPC ........ *G03G 21/1666* (2013.01); *H04N 1/00543* (2013.01); *H04N 1/00557* (2013.01); *H04N 1/00559* (2013.01); *G03G 15/0409* (2013.01); *G03G 15/04036* (2013.01)

(58) Field of Classification Search
CPC .......... H04N 1/00557; H04N 1/00543; H04N 1/00559; G03G 21/1666; G03G 15/04036; G03G 15/0409
USPC ............................................................ 399/4
See application file for complete search history.

(56) References Cited

FOREIGN PATENT DOCUMENTS

JP 2000-010036 A 1/2000

*Primary Examiner* — David Gray
*Assistant Examiner* — Tyler Hardman
(74) *Attorney, Agent, or Firm* — Studebaker & Brackett PC (57) ABSTRACT

An attachment mechanism of an optical scanning device includes a frame body provided with a supporting base having engaging parts; and a position fixing member arranged between the optical scanning device and the supporting base to have an erection plate, a first supporting plate and a second supporting plate. The first or second supporting plate includes a fitted hole fitting with a positioning boss of the optical scanning device. The first and second supporting plates respectively include first engaged parts and second engaged parts. The position fixing member is attached to the supporting base by engaging one of the first engaged parts and one of the second engaged parts with the engaging parts. The position fixing member changes a plane position of the fitted hole by engaging positions of the engaging parts with the first and second engaged parts and changes a height of the fitted hole by inverting.

5 Claims, 10 Drawing Sheets

ATTACHMENT MECHANISM OF OPTICAL SCANNING DEVICE AND IMAGE FORMING APPARATUS INCLUDING THIS ATTACHMENT MECHANISM

INCORPORATION BY REFERENCE

This application is based on and claims the benefit of priority from Japanese Patent application No. 2014-153485 filed on Jul. 29, 2014, the entire contents of which are incorporated herein by reference.

BACKGROUND

The present disclosure relates to an attachment mechanism of an optical scanning device and an image forming apparatus including this attachment mechanism.

An electrophotographic image forming apparatus includes an optical scanning device emitting a scanning light. The optical scanning device radiates a surface of a photoreceptor with the scanning light to form an electrostatic latent image corresponding to image data.

The optical scanning device has a problem that an imaging distance (a focal distance) of the scanning light to the photoreceptor and an imaging position (a writing position or a focal position) of the scanning light on the photoreceptor are displaced from a correct distance and a correct position due to a dimension error of components, an assembling error of components to a frame body and others. Therefore, the optical scanning device includes a position fixing member working separately as a displacement adjustment of the imaging distance and a displacement adjustment of the imaging position.

Alternatively, there is an optical deflection scanning device, in which a pair of positioning plates having positioning pins movable according to an attached position of the optical scanning device are arranged at both sides of the optical scanning device, adjusting relative positions of the optical scanning device and the photoreceptor by movement of the positioning pins.

However, the above-mentioned position fixing member needs to work separately as a displacement adjustment of the imaging distance and a displacement adjustment of the imaging position. In addition, there is a problem that it is necessary to replace the position fixing member for every adjustment and it is necessary to prepare dedicated jigs and tools for adjustment.

The above-mentioned optical deflection scanning device has a problem of taking labor and time for two position displacement adjustments. That is, it is impossible to carry out two position displacement adjustments easily and accurately.

SUMMARY

In accordance with an embodiment of the present disclosure, an attachment mechanism of an optical scanning device includes a frame body and a position fixing member. The frame body includes a supporting base to which the optical scanning device is assembled. The position fixing member is arranged between the optical scanning device and the supporting base when assembling the optical scanning device. The supporting base includes a pair of engaging parts arranged separately from each other on its upper face. The position fixing member includes an erection plate and a first supporting plate and a second supporting plate formed perpendicular to the erection plate and extended from upper and lower end parts of the erection plate in opposite directions to each other. One of the first supporting plate and the second supporting plate includes a fitted hole into which a positioning boss protruded on a lower face of the optical scanning device is fitted. The first supporting plate includes a plurality of first engaged parts arranged at predetermined intervals. The second supporting plate includes a plurality of second engaged parts arranged at predetermined intervals. The position fixing member is attached to the upper face of the supporting base by engaging one of the plurality of first engaged parts and one of the plurality of second engaged parts with the pair of engaging parts. The position fixing member is configured so as to change a plane position of the fitted hole in accordance with engaging positions of the pair of engaging parts with the plurality of first engaged parts and the plurality of second engaged parts. The position fixing member is configured so as to change a height of the fitted hole by inverting top and bottom.

In accordance with an embodiment of the present disclosure, an image forming apparatus includes an attachment mechanism of an optical scanning device. The attachment mechanism of the optical scanning device includes a frame body and a position fixing member. The frame body includes a supporting base to which the optical scanning device is assembled. The position fixing member is arranged between the optical scanning device and the supporting base when assembling the optical scanning device. The supporting base includes a pair of engaging parts arranged separately from each other on its upper face. The position fixing member includes an erection plate and a first supporting plate and a second supporting plate formed perpendicular to the erection plate and extended from upper and lower end parts of the erection plate in opposite directions to each other. One of the first supporting plate and the second supporting plate includes a fitted hole into which a positioning boss protruded on a lower face of the optical scanning device is fitted. The first supporting plate includes a plurality of first engaged parts arranged at predetermined intervals. The second supporting plate includes a plurality of second engaged parts arranged at predetermined intervals. The position fixing member is attached to the upper face of the supporting base by engaging one of the plurality of first engaged parts and one of the plurality of second engaged parts with the pair of engaging parts. The position fixing member is configured so as to change a plane position of the fitted hole in accordance with engaging positions of the pair of engaging parts with the plurality of first engaged parts and the plurality of second engaged parts. The position fixing member is configured so as to change a height of the fitted hole by inverting top and bottom.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

In the following, a preferable embodiment of the present disclosure will be described with reference to the appended drawings.

Figure 1:
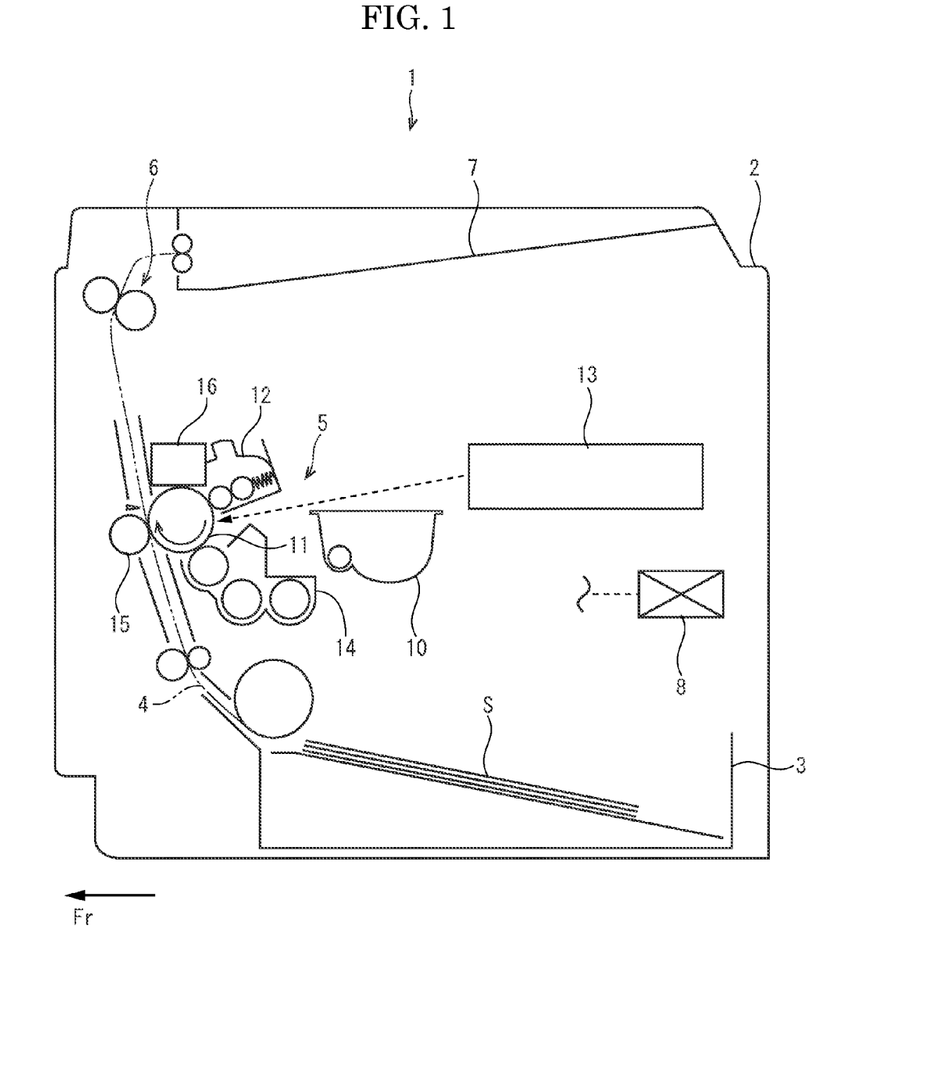
FIG. 1 is a sectional view schematically showing an inner structure of a printer in accordance with an embodiment of the present disclosure.

With reference to FIG. 1, entire structure of a printer 1 as an image forming apparatus will be described. FIG. 1 is a sectional view schematically showing an inner structure of the printer 1. Incidentally, for convenience of explanation, an arrow Fr indicated in each figure indicates the front side of the printer 1.

The printer 1 includes a roughly box-like formed apparatus main body 2, a sheet feeding cartridge 3, an image forming part 5, a fixing device 6 and a sheet ejected tray 7. The sheet feeding cartridge 3 stores a sheet S inside. The image forming part 5 transfers a toner image onto the sheet S fed from the sheet feeding cartridge 3 to a conveying path 4. The fixing device 6 fixes the transferred toner image onto the sheet S. The sheet ejected tray 7 works as an ejection destination of the sheet S after fixing. The printer 1 is integrally controlled by a controlling device 8. The sheet S is not restricted by paper and may be a resin film, OHP (OverHead Projector) sheet or the like.

The image forming part 5 includes a toner container 10 containing a replenishment toner (a developer) and a photosensitive drum 11 as an image carrier. The image forming part 5 includes a charging device 12, an optical scanning device 13, a developing device 14, a transferring roller 15 and a cleaning device arranged around the photosensitive drum 11 in transferring process order.

The photosensitive drum 11 is supported in a state rotatable around an axial line by the apparatus main body 2. The photosensitive drum 11 is driven and rotated in a clockwise direction in FIG. 1 by a driving motor (not shown).

Now, image forming operation of the printer 1 will be described. When the power is supplied to the printer 1, the controlling device 8 executes initialization of various parameters and others. Subsequently, when, from a personal computer or the like connected with the printer 1, image data is inputted and a printing start is directed to the printer 1, the controlling device 8 executes image forming process as follows.

The optical scanning device 13 emits a laser light (refer to a broken line in FIG. 1) corresponding to the image data roughly forwardly. Thereby, an electrostatic latent image is formed on a surface of the photosensitive drum 11 electrically charged at a predetermined electrical potential by the charging device 12. The developing device 14 develops the electrostatic latent image to the toner image by the toner supplied from the toner container 10.

On the other hand, the sheet S fed from the sheet feeding cartridge 3 is conveyed in the conveying path 4 to pass through between the photosensitive drum 11 and the transferring roller 15. The transferring roller 15 transfers the toner image onto the sheet S by an applied transferring bias. The fixing device 6 fixes the toner image onto the sheet S. The sheet S after fixing by the fixing device 6 is ejected from a downstream end of the conveying path 4 onto the sheet ejected tray 7. Incidentally, a remained toner on the photosensitive drum 11 is collected by the cleaning device 16.

Figure 2:
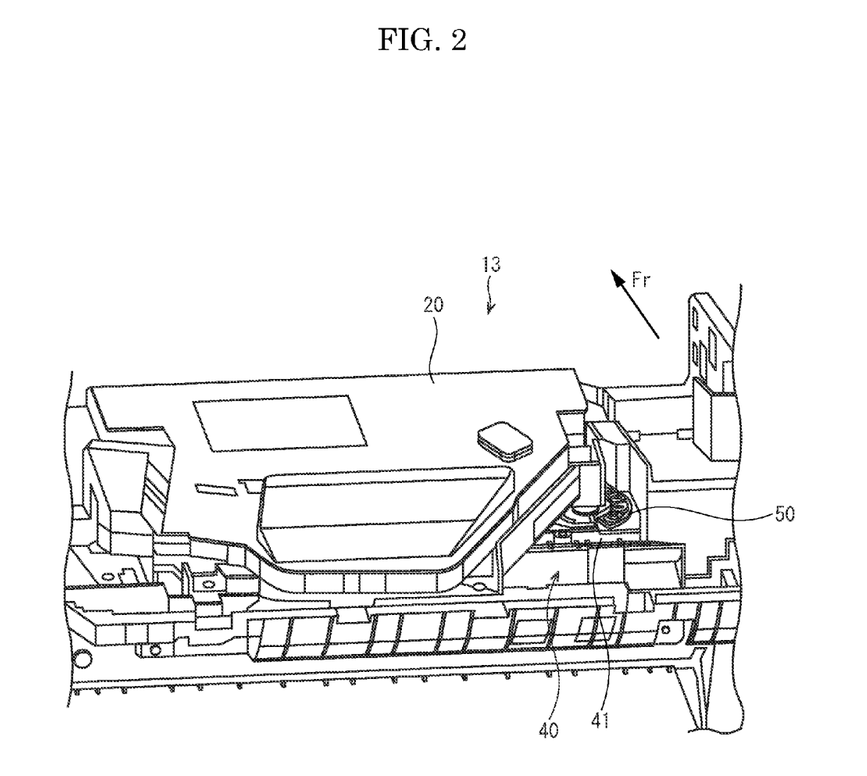
FIG. 2 is a perspective view showing an optical scanning device in a situation assembled to a supporting base in the printer in accordance with the embodiment of the present disclosure.
Figure 3:
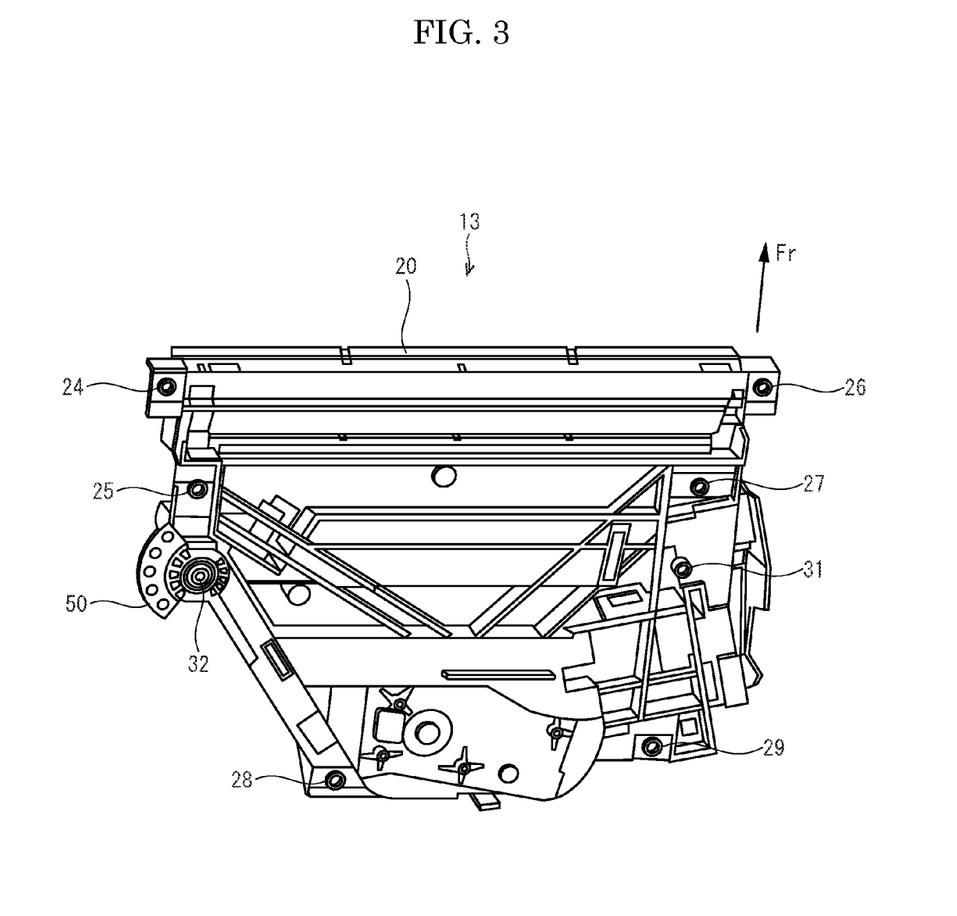
FIG. 3 is a perspective view showing the optical scanning device and a position fixing member in the printer in accordance with the embodiment of the present disclosure.

Next, with reference to FIGS. 2 and 3, entire structure of the optical scanning device 13 will be described. FIG. 2 is a perspective view showing the optical scanning device 13 in a situation assembled to a supporting base 41. FIG. 3 is a perspective view showing the optical scanning device 13 and a position fixing member 50.

The optical scanning device 13 is installed in the apparatus main body 2 (refer to FIG. 1). As shown in FIG. 2, an optical box 20 constituting external appearance of the optical scanning device 13 is formed in a roughly trapezoid shape as viewed from a plane. The optical box 20 is made of, for example, hard resin material, such as polypropylene. Inside the optical box 20, various optical components, such as a light source (not shown) radiating the photosensitive drum 11 with the laser light and a polygon mirror (not shown), are arranged.

As shown in FIG. 3, on a lower face of the optical box 20, a plurality (e.g. six) of circular protrusion parts (cylinder parts) 24-29 are protruded. On the lower face of the optical box 20, in both end parts in left and right directions, a circular protrusion part 31 and a positioning boss 32 are respectively protruded at roughly center in forward and backward directions. The circular protrusion part 31 works as a turning center when turning the optical scanning device 13 (the optical box 20).

Figure 4:
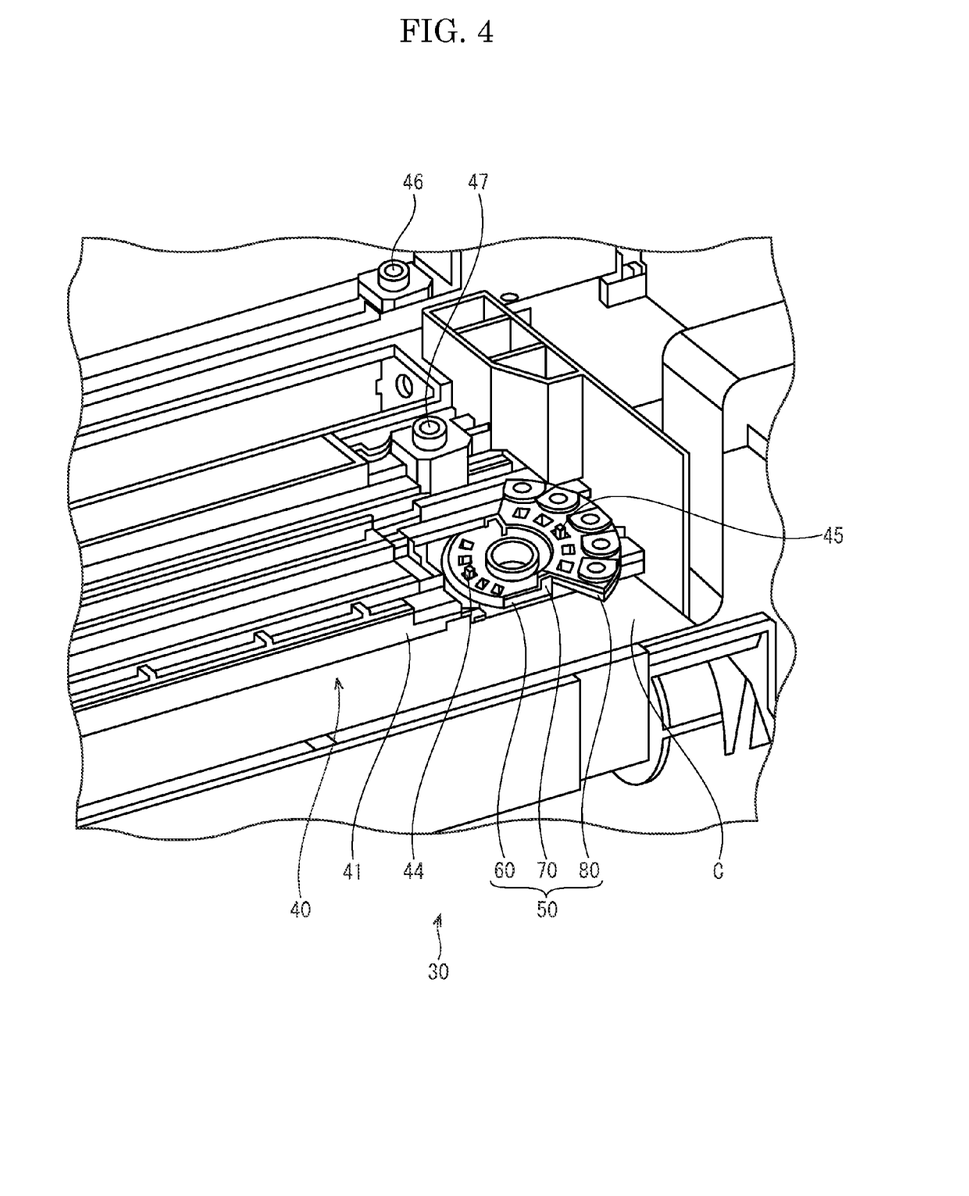
FIG. 4 is a perspective view showing an attachment mechanism and its periphery of the optical scanning device in accordance with the embodiment of the present disclosure.
Figure 5:
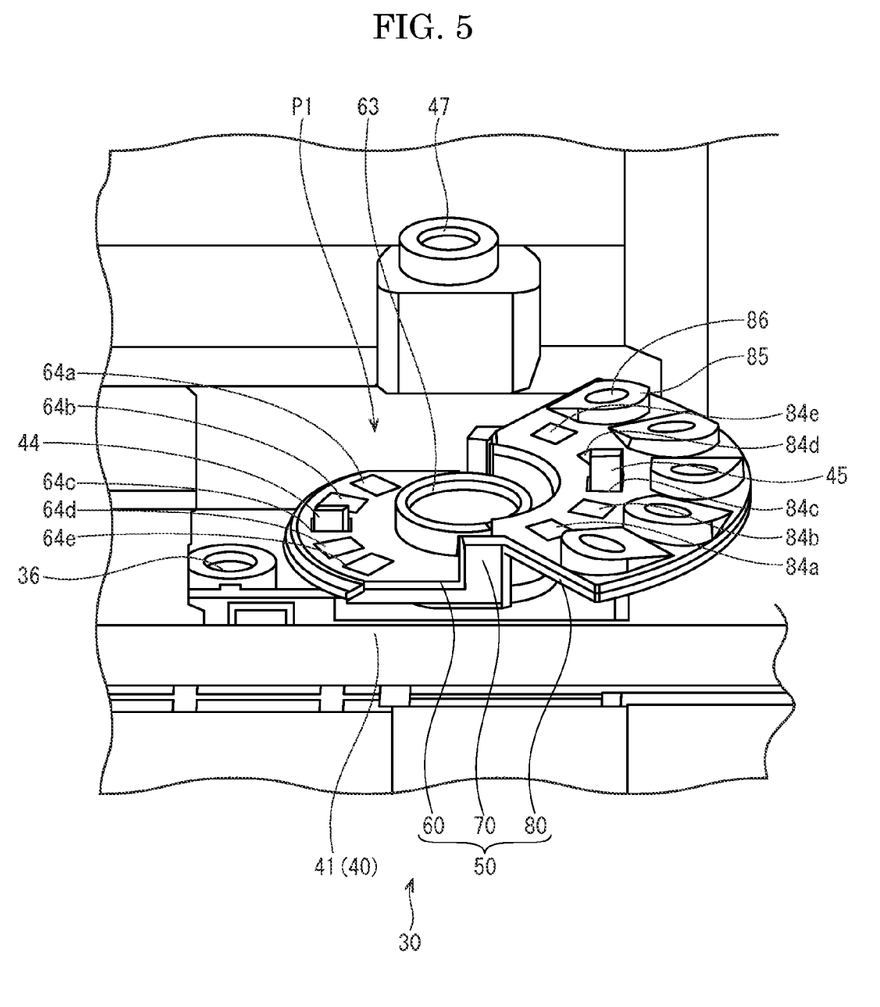
FIG. 5 is a perspective view showing the attachment mechanism of the optical scanning device in accordance with the embodiment of the present disclosure.
Figure 6:
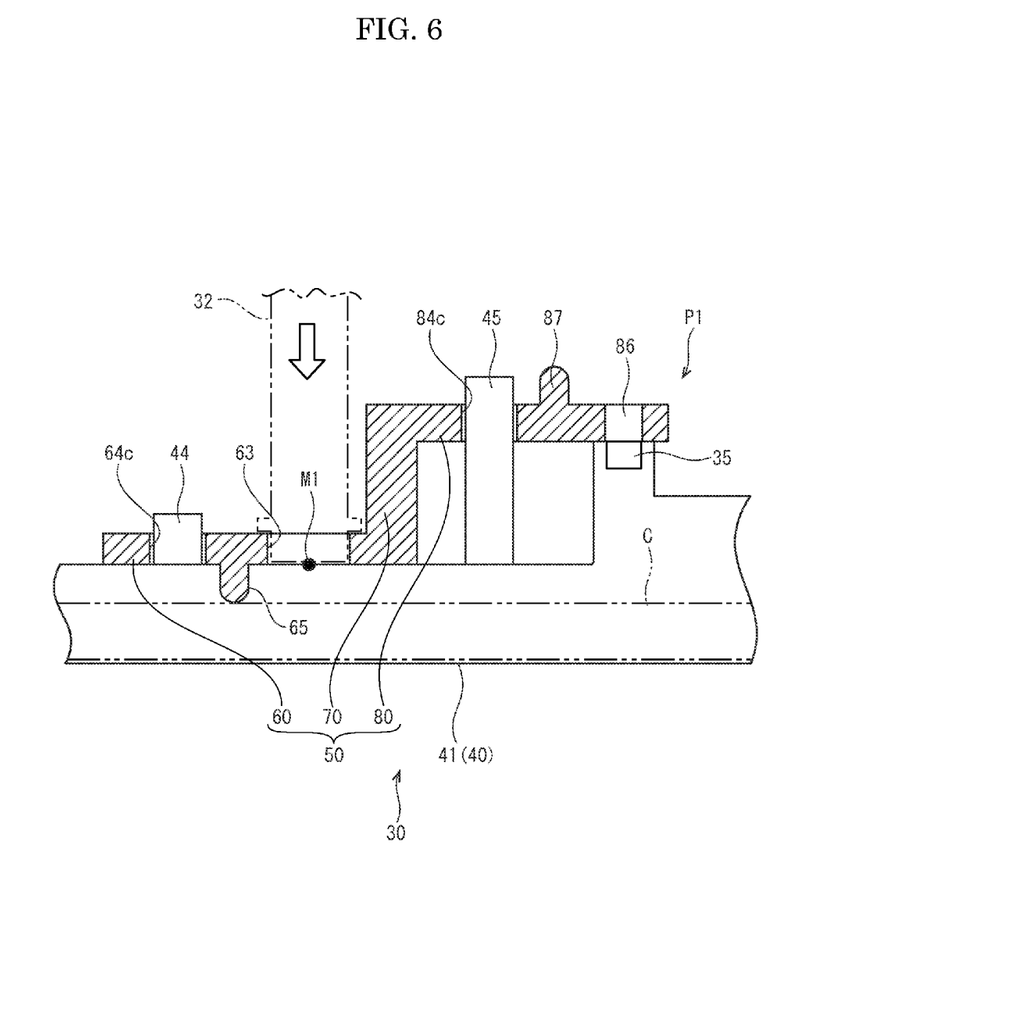
FIG. 6 is a vertical sectional view showing the attachment mechanism of the optical scanning device in accordance with the embodiment of the present disclosure.
Figure 7:
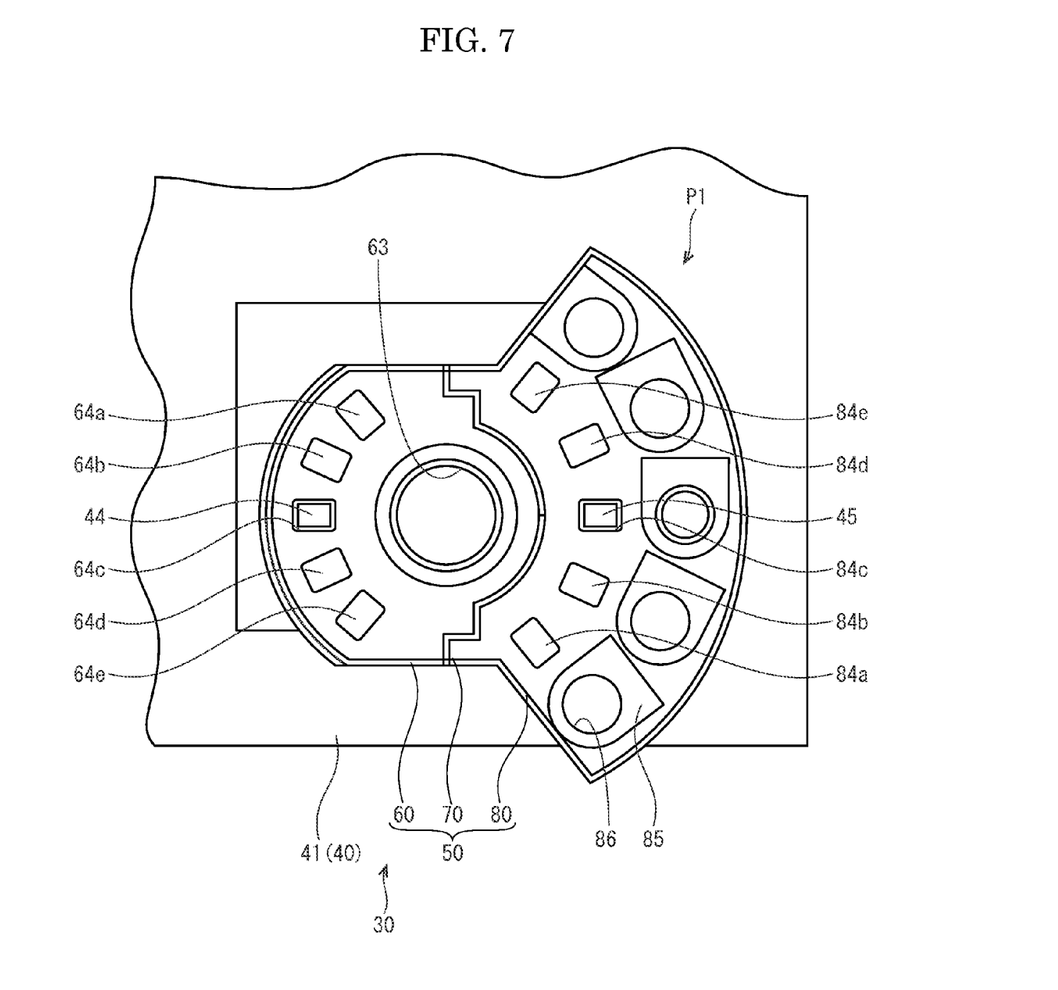
FIG. 7 is a plane view showing the attachment mechanism of the optical scanning device in accordance with the embodiment of the present disclosure.

The printer 1 includes an attachment mechanism 30 attaching the optical scanning device 13 inside the apparatus main body 2. In the following, with reference to FIGS. 4-7, the attachment mechanism 30 of the optical scanning device 13 will be described. FIG. 4 is a perspective view showing the attachment mechanism 30 and its periphery. FIG. 5 is a perspective view showing the attachment mechanism 30. FIG. 6 is a vertical sectional view showing the attachment mechanism 30. FIG. 7 is a plane view showing the attachment mechanism 30.

As shown in FIG. 4, the attachment mechanism 30 of the optical scanning device 13 includes a frame body 40 and the positioning fixing member 50. The frame body 40 is arranged inside the apparatus main body 2 and has the supporting base 41 assembling the optical scanning device 13 (the optical box 20). The positioning fixing member 50 is arranged between the optical scanning device 13 and the supporting base 41 (refer to FIG. 2) when the optical scanning device 13 is assembled.

The supporting base 41 has a pair of engaging protrusion parts 44 and 45 as engaging parts arranged separately from each other on an upper face of the supporting base 41. The pair of engaging protrusion parts 44 and 45 are erected at one side (at a right side in FIG. 4) of the supporting base 41. In the supporting base 41, a plurality (e.g. six) of fitted parts are formed, into which the circular protrusion parts 24-29 of the optical box 20 are respectively fitted when assembling the optical scanning device 13. Incidentally, into the fitted parts 46 and 47 shown in FIG. 4, the circular protrusion parts 24 and 25 of the optical box 20 are respectively fitted. Illustration of other fitted parts is omitted.

The position fixing member 50 is provided in order to adjust an imaging distance (a focal distance) of a scanning light (the laser light) to the photosensitive drum 11 and an imaging position (a writing position or a focal position) of the scanning light on the photosensitive drum 11.

As shown in FIGS. 5-7, the position fixing member 50 is configured to include an erection plate 70, a first supporting plate 60 and a second supporting plate 80.

The position fixing member 50 is made of, for example, hard resin material, such as polypropylene. The erection plate 70 is perpendicularly arranged. The first supporting plate 60 and the second supporting plate 80 are formed perpendicular to the erection plate 70 and extended from upper and lower end parts of the erection plate 70 in opposite directions to each other. That is, the position fixing member 50 is formed so as to be bent in a crank shape as viewed from a lateral face. Incidentally, in the description of the embodiment, a posture of the position fixing member 50, in which the first supporting plate 60 comes into contact with the upper face of the supporting base 41, (often called as an "upright posture P1") is defined as a standard.

The first supporting plate 60 is formed in a roughly half circular shape (a roughly fan shape) as viewed from a plane (refer to FIG. 7). The first supporting plate 60 has a fitted hole 63 into which the positioning boss 32 protruded on the lower face of the optical scanning device 13 (the optical box 20) is fitted. The fitted hole 63 is formed so as to penetrate the first supporting plate 60 at a side of the erection plate 70. Incidentally, the fitted hole 63 may be formed in the second supporting plate 80.

The first supporting plate 60 has first engaged holes 64a-64e as a plurality (e.g. five) of first engaged parts arranged at predetermined intervals. The first engaged holes 64a-64e are arranged along an arc shape of the first supporting plate 60 at an extended end side (at a left end side in FIG. 5) of the first supporting plate 60. The first engaged holes 64a-64e are formed so as to penetrate with a rectangular profile as viewed from a plane. On a lower face of the first supporting plate 60, a first cable locking part 65 (refer to FIG. 6) is protruded.

The second supporting plate 80 is formed in a roughly half circular shape (a roughly fan shape) as viewed from a plane (refer to FIG. 7) similar to the first supporting plate 60. The second supporting plate 80 has second engaged holes 84a-84e as a plurality (e.g. five) of second engaged parts arranged at predetermined intervals. The second engaged holes 84a-84e are arranged along an arc shape of the second supporting plate 80 at a side of the erection plate 70. The second engaged holes 84a-84e are formed so as to penetrate with a rectangular profile as viewed from a plane. On an upper face of the second supporting plate 80, a second cable locking part 87 (refer to FIG. 6) is protruded.

Figure 10:
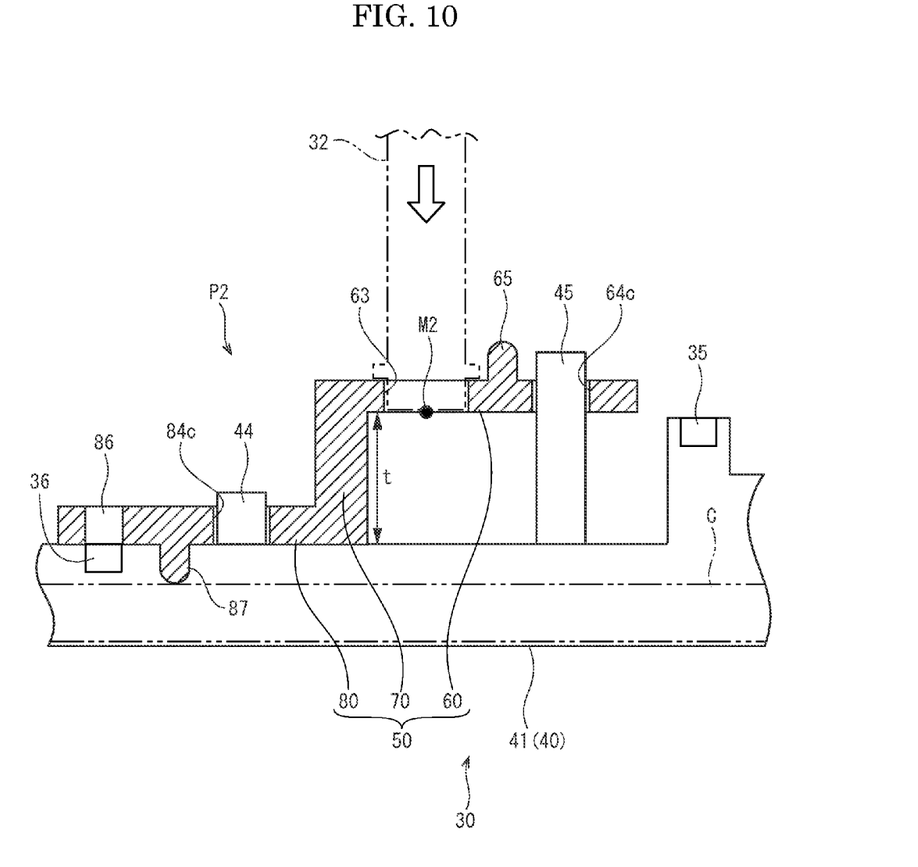
FIG. 10 is a vertical sectional view showing the attachment mechanism of the optical scanning device, when the position fixing member is inverted, in accordance with the embodiment of the present disclosure.

The first cable locking part 65 and the second cable locking part 87 are provided in order to lock a wiring cable C (refer to FIGS. 6 and 10) arranged around the supporting base 41 as described later in detail. Incidentally, in other figures than FIGS. 6 and 10, illustration of the cable locking parts 65 and 87 are omitted. The wiring cable C is, for example, a flat cable.

Incidentally, at an extended end side (at a right end side in FIG. 5) of the second supporting plate 80, a plurality (e.g. five) of ribs 85 are formed along an arc shape. At the center of each rib 85, a circular hole 86 is formed.

The position fixing member 50 as described above is attached to the upper face of the supporting base 41 by engaging any one of five first engaged holes 64a-64e and any one of five second engaged holes 84a-84e with the pair of engaging protrusion parts 44 and 45 (refer to FIGS. 5 and 6). When the optical scanning device 13 is assembled to the supporting base 41, the positioning boss 32 protruded on the lower face of the optical box 20 is fitted into the fitted hole 63 of the position fixing member 50. Thereby, the optical scanning device 13 positioned and attached.

Figure 8A:
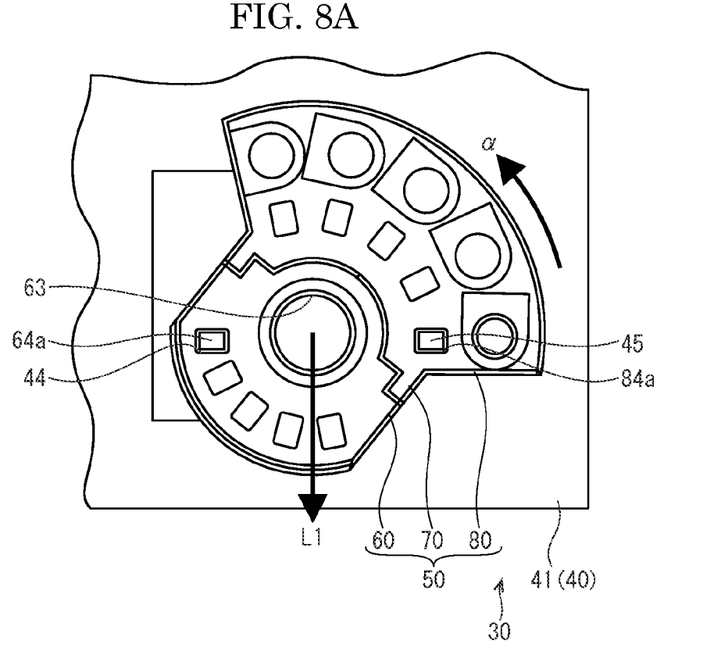
FIG. 8A is a plane view showing the attachment mechanism of the optical scanning device, in a situation where the position fixing member is attached at a first position, in accordance with the embodiment of the present disclosure.
Figure 8B:
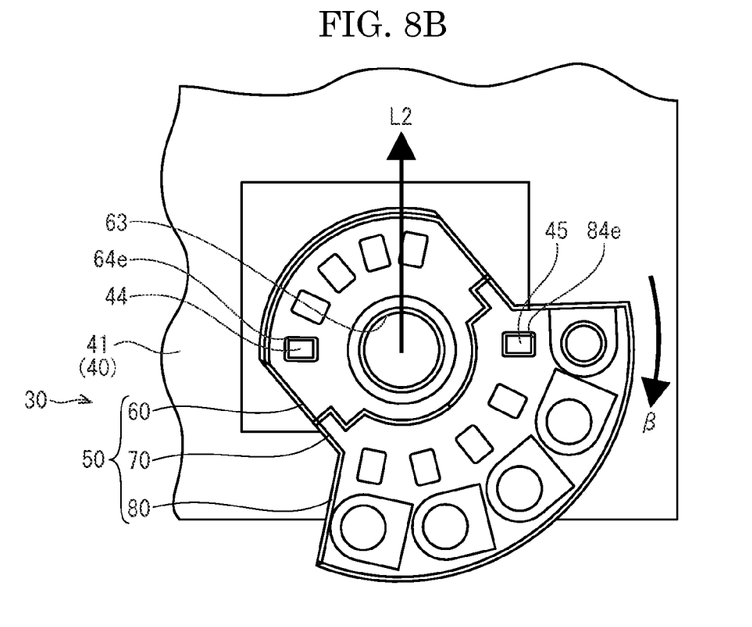
FIG. 8B is a plane view showing the attachment mechanism of the optical scanning device, in a situation where the position fixing member is attached at a second position, in accordance with the embodiment of the present disclosure.
Figure 9:
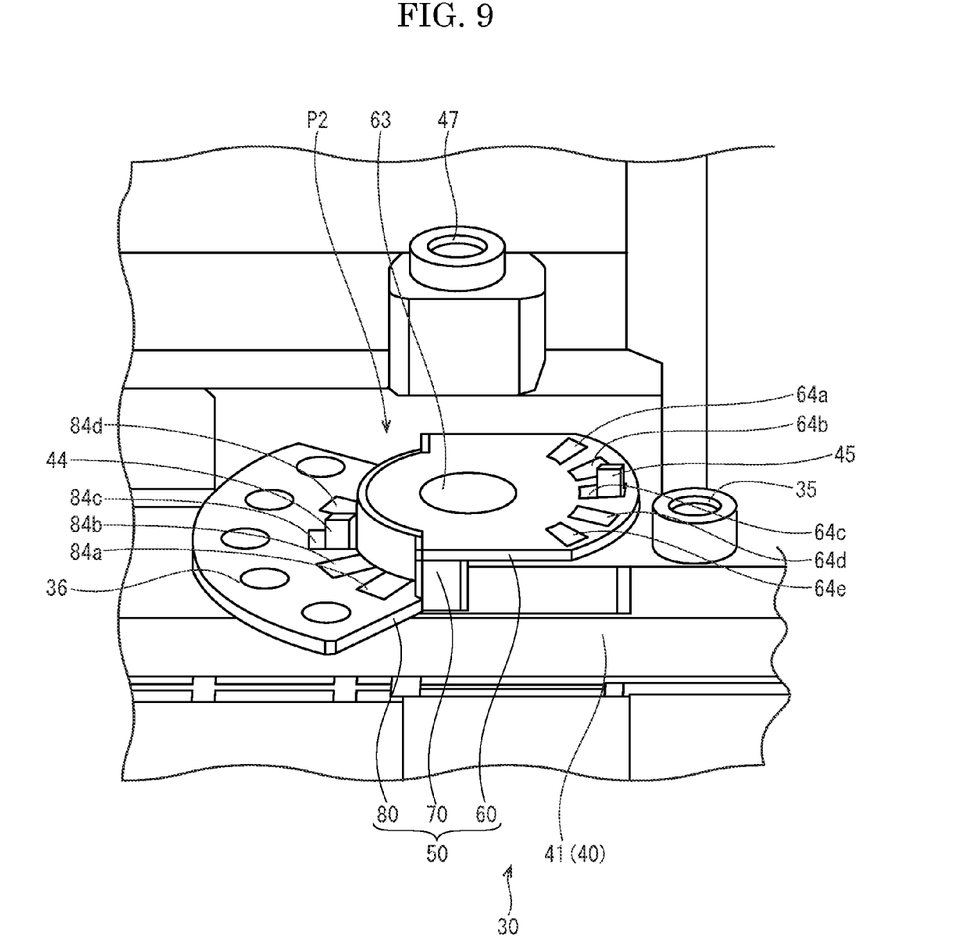
FIG. 9 is a perspective view showing the attachment mechanism of the optical scanning device, when the position fixing member is inverted, in accordance with the embodiment of the present disclosure.

Next, with reference to FIGS. 6-10, procedure of positioning adjustment of the position fixing member 50 will be described. FIG. 8A is a plane view showing the attachment mechanism 30, in a situation where the position fixing member 50 is attached at a first position. FIG. 8B is a plane view showing the attachment mechanism 30, in a situation where the position fixing member 50 is attached at a second position. FIG. 9 is a perspective view showing the attachment mechanism 30 when the position fixing member 50 is inverted. FIG. 10 is a vertical sectional view showing the attachment mechanism 30 when the position fixing member 50 is inverted.

Incidentally, as shown in FIG. 7, a situation of the position fixing member 50 where the engaging protrusion part 44 is engaged with the first engaged hole 64c positioned at the center of the first supporting plate 60 and the engaging protrusion part 45 is engaged with the second engaged hole 84c positioned at the center of the second supporting plate 80 is called as a "standard position". The procedure will be described on the basis of the position fixing member 50 taking the upright posture P1.

First, with reference to FIGS. 6, 7, 8A and 8B, a case of adjusting the imaging distance of the scanning light to the photosensitive drum 11 will be described.

The position fixing member 50 is configured so as to be capable of changing a position of a central axis of the fitted hole 63 in a plane, i.e. in forward and backward directions and in left and right directions, (hereinafter, often called as a plane position of the fitted hole 63) in accordance with engaging positions of the first engaged holes 64a-64e and the second engaged holes 84a-84e with the pair of engaging protrusion parts 44 and 45. By changing the plane position of the fitted hole 63 into which the positioning boss 32 is fitted, a plane position of the optical scanning device 13 is adjusted.

In the case of adjusting the imaging distance of the scanning light, a worker detaches the position fixing member 50 being at the standard position (refer to FIG. 7) once (engaging of the engaging protrusion parts 44 and 45 with the engaged holes 64c and 84c is released).

Subsequently, the worker turns the position fixing member 50 in an optional direction. For example, the worker turns the position fixing member 50 in a direction of an arrow α in FIG. 8A to engage the engaging protrusion part 44 with the first engaged hole 64a positioned at one end of the first supporting plate 60 and to engage the engaging protrusion part 45 with the second engaged hole 84a positioned at one end of the second supporting plate 80. Incidentally, such a situation is called as a "first position". When the position fixing member 50 is attached at the first position, the plane position of the position fixing member 50 is moved in a direction of an arrow L1 in FIG. 8A. That is, because the fitted hole 63, into which the positioning boss 32 of the optical box 20 is fitted, is also moved in the arrow L1's direction, an assembling position of the optical scanning device 13 is moved in the arrow L1's direction.

Alternatively, for example, the worker turns the position fixing member 50 in a direction of an arrow β in FIG. 8B to engage the engaging protrusion part 44 with the first engaged hole 64e positioned at another end of the first supporting plate 60 and to engage the engaging protrusion part 45 with the second engaged hole 84e positioned at another end of the second supporting plate 80. Incidentally, such a situation is called as a "second position". When the position fixing member 50 is attached at the second position, the plane position of the position fixing member 50 is moved in a direction of an arrow L2 in FIG. 8B. That is, because the fitted hole 63, into which the positioning boss 32 of the optical box 20 is fitted, is also moved in the arrow L2's direction, an assembling position of the optical scanning device 13 is moved in the arrow L2's direction.

As described above, it is possible to adjust the imaging distance of the scanning light by adjusting the plane position of the scanning device 13. Incidentally, the pair of engaging protrusion parts 44 and 45 may be engaged with optional combination of the first engaged hole and the second engaged hole facing to each other. In the embodiment, when the engaging positions of the engaging protrusion parts 44 and 45 with the first engaged holes 64a-64e and the second engaged holes 84a-84e are shifted from one first engaged hole and one second engaged hole to next first engaged hole and next second engaged hole, the imaging distance is moved by approximately 0.3 mm in the arrow L1's direction or the arrow L2's direction. However, moving distance may be set optionally.

When the position fixing member 50 is attached so as to take the upright posture P1, the first cable locking part 65 holds an upper face of the wiring cable C passing through a lower side of the first supporting plate 60 (refer to FIG. 6).

Next, with reference to FIGS. 9 and 10, a case of adjusting the imaging position of the scanning light on the photosensitive drum 11 will be described.

The position fixing member 50 can change a height of the fitted hole 63 by top and bottom inversion. That is, by changing the height of the fitted hole 63 into which the positioning boss 32 is fitted, a height of the optical scanning device 13 is adjusted. Incidentally, in the description of the embodiment, a posture of the position fixing member 50, in which top and bottom of the position fixing member 50 are inverted and the second supporting plate 80 comes into contact with the upper face of the supporting base 41, is called as an "inverted posture P2". When the position fixing member 50 taking the inverted posture P2 is at the standard position, the engaging protrusion part 45 is engaged with the first engaged hole 64c positioned at the center of the first supporting plate 60 and the engaging protrusion part 44 is engaged with the second engaged hole 84c positioned at the center of the second supporting plate 80.

When the position fixing member 50 takes the inverted posture P2, the first supporting plate 60 is arranged separately from the upper face of the supporting base 41. That is, the first supporting plate 60 is arranged at a position separated from the upper face of the supporting base 41 by a height (a distance t) of the erection plate 70 (refer to FIG. 10). In other words, because the fitted hole 63, into which the positioning boss 32 is fitted, is moved upwardly from the upper face of the supporting base 41 by the distance t, and therefore, an assembling height of the optical scanning device 13 is moved by the distance t.

As described above, it is possible to adjust the imaging position of the scanning light by adjusting a height position of the optical scanning device 13. That is, a fitting height M2 (refer to FIG. 10) of the fitted hole 63 of the position fixing member 50 taking the inverted posture P2 and the positioning boss 32 is higher than a fitting height M1 (refer to FIG. 6) of the fitted hole 63 of the position fixing member 50 taking the upright posture P1 and the positioning boss 32 (M2>M1). Incidentally, the fitting height M2 may be set optionally according to the height dimension of the erection plate 70.

The position fixing member 50 is configured, even if the position fixing member 50 takes the inverted posture P2, so as to be capable changing the plane position similar to a case of the upright posture P1. That is, the position fixing member 50 can adjust the imaging distance of the scanning light to the photosensitive drum 11 regardless of the posture.

When the position fixing member 50 is attached so as to take the inverted posture P2, the second cable locking part 87 holds an upper face of the wiring cable C passing through a lower side of the second supporting plate 80 (refer to FIG. 10).

Incidentally, the position fixing member 50 is fixed to the supporting base 41 by inserting a screw (not shown) into the circular hole 86 of any one of the ribs 85 and screwing the screw into a screw hole 35 (refer to FIGS. 6, 9 and 10) or a screw hole 36 (refer to FIGS. 5, 9 and 10).

In accordance with the attachment mechanism 30 of the optical scanning device 13 according to the embodiment as described above, the plane position of the fitted hole 63 is changed by changing the engaging positions of the engaging protrusion parts 44 and 45 with the first engaged holes 64a-64e and the second engaged holes 84a-84e. That is, the plane position of the optical scanning device 13 when being assembled is changed. Moreover, the height of the fitted hole 63 is changed by inverting top and bottom of the position fixing member 50. That is, the height of the optical scanning device 13 when being assembled is changed. Thereby, it is possible to adjust displacement of the imaging distance of the scanning light to the photosensitive drum 11 and displacement of the imaging position of the scanning light on the photosensitive drum 11 easily and accurately by one position fixing member 50. Accordingly, it is possible to reduce adjustment man hour and to reduce cost.

Incidentally, because the optical scanning device 13 according to the embodiment is installed into the image forming apparatus with vertical conveyance to emit the scanning light (the laser light) roughly forwardly, although the imaging distance is adjusted by changing the plane position and the imaging position is adjusted by changing the height, the present disclosure is not restricted by this. For example, in a case where the optical scanning device 13 is installed into the image forming apparatus with a conveying path arranged in an S-shape and the photosensitive drum 11 is arranged above the optical scanning device 13, the optical scanning device 13 may emit the laser light upwardly. In this case, the imaging position may be adjusted by changing the plane position of the optical scanning device 13 (the position fixing member 50) and the imaging distance may be adjusted by changing the height of the optical scanning device 13.

In accordance with the attachment mechanism 30 of the optical scanning device 13 according to the embodiment, the wiring cable C is locked by the first cable locking part 65 or the second cable locking part 87. Therefore, it is possible to prevent, for example, unexpected bending, breaking down and other failure of the wiring cable C.

Although the attachment mechanism 30 of the optical scanning device 13 according to the embodiment is configured so that the supporting plates 60 and 80 include the plurality of the engaged holes 64a-64e and 84a-84e and the supporting base 41 includes the pair of engaging protrusion parts 44 and 45, the present disclosure is not restricted by this. For example, the supporting plate 60 and 80 may include a pair of engaging protrusion parts and the supporting base 41 may include a plurality of the engaged holes.

Although the attachment mechanism 30 of the optical scanning device 13 according to the embodiment is configured so that the supporting plates 60 and 80 include respective five engaged holes 64a-64e and 84a-84e arranged at predetermined intervals, the present disclosure is not restricted by this. The number of the engaged holes of each supporting plate may be two or more.

Although, in the embodiment, the supporting plates 60 and 80 of the position fixing member 50 are formed in a roughly half circular shape as viewed from a plane, the present disclosure is not restricted by this. The supporting plates 60 and 80 may be formed in a polygonal shape, such as a rectangular, as viewed from a plane.

Although the attachment mechanism 30 of the optical scanning device 13 according to the embodiment is configured so that the position fixing member 50 is turned in order to engage any one combination of the engaged holes 64a-64e and 84a-84e with the pair of engaging protrusion parts 44 and 45, the present disclosure is not restricted by this. For example, a plurality of engaged holes may be arranged in a linear and the position fixing member 50 may be moved in a linear.

While the preferable embodiment and its modified example of the attachment mechanism of the optical scanning device and the image forming apparatus including this attachment mechanism of the present disclosure have been described above and various technically preferable configurations have been illustrated, a technical range of the disclosure is not to be restricted by the description and illustration of the embodiment. Further, the components in the embodiment of the disclosure may be suitably replaced with other components, or variously combined with the other components. The claims are not restricted by the description of the embodiment of the disclosure as mentioned above.

What is claimed is:

1. An attachment mechanism of an optical scanning device comprising:
    a frame body including a supporting base to which the optical scanning device is assembled; and
    a position fixing member arranged between the optical scanning device and the supporting base when assembling the optical scanning device,
    wherein the supporting base includes a pair of engaging parts arranged separately from each other on its upper face,
    the position fixing member includes an erection plate and a first supporting plate and a second supporting plate formed perpendicular to the erection plate and extended from upper and lower end parts of the erection plate in opposite directions to each other,
    one of the first supporting plate and the second supporting plate includes a fitted hole into which a positioning boss protruded on a lower face of the optical scanning device is fitted,
    the first supporting plate includes a plurality of first engaged parts arranged at predetermined intervals,
    the second supporting plate includes a plurality of second engaged parts arranged at predetermined intervals,
    the position fixing member is attached to the upper face of the supporting base by engaging one of the plurality of first engaged parts and one of the plurality of second engaged parts with the pair of engaging parts, and configured so as to change a plane position of the fitted hole in accordance with engaging positions of the pair of engaging parts with the plurality of first engaged parts and the plurality of second engaged parts and to change a height of the fitted hole by inverting the position fixing member.

2. The attachment mechanism of the optical scanning device according to claim 1, wherein
    at least one of the first supporting plate and the second supporting plate includes a cable locking part locking a wiring cable arranged around the supporting base.

3. The attachment mechanism of the optical scanning device according to claim 1, wherein
    the first supporting plate is formed in a half circular shape,
    the plurality of first engaged parts is arranged along an arc shape of the first supporting plate,
    the second supporting plate is formed in a half circular shape,
    the plurality of second engaged parts is arranged along an arc shape of the second supporting plate,
    the position fixing member is configured to be turnable.

4. The attachment mechanism of the optical scanning device according to claim 3, wherein
    the supporting base includes a pair of screw holes arranged separately from each other formed on its upper face,
    the second supporting plate includes a plurality of ribs formed along an arc shape,
    each rib includes a circular hole formed at its center,
    the position fixing member is fixed to the supporting base by inserting a screw into the circular hole of one of the ribs and screwing the screw into one of the pair of the screw holes.

5. An image forming apparatus comprising:
    an attachment mechanism of an optical scanning device,
    wherein the attachment mechanism of the optical scanning device includes:
    a frame body including a supporting base to which the optical scanning device is assembled; and
    a position fixing member arranged between the optical scanning device and the supporting base when assembling the optical scanning device,
    the supporting base includes a pair of engaging parts arranged separately from each other on its upper face,
    the position fixing member includes an erection plate and a first supporting plate and a second supporting plate formed perpendicular to the erection plate and extended from upper and lower end parts of the erection plate in opposite directions to each other,
    one of the first supporting plate and the second supporting plate includes a fitted hole into which a positioning boss protruded on a lower face of the optical scanning device is fitted,
    the first supporting plate includes a plurality of first engaged parts arranged at predetermined intervals,
    the second supporting plate includes a plurality of second engaged parts arranged at predetermined intervals,
    the position fixing member is attached to the upper face of the supporting base by engaging one of the plurality of first engaged parts and one of the plurality of second engaged parts with the pair of engaging parts, and configured so as to change a plane position of the fitted hole in accordance with engaging positions of the pair of engaging parts with the plurality of first engaged parts and the plurality of second engaged parts and to change a height of the fitted hole by inverting the position fixing member.

* * * * *